(12) United States Patent
Hjalmtysson

(10) Patent No.: US 6,292,823 B1
(45) Date of Patent: Sep. 18, 2001

(54) METHOD AND APPARATUS FOR COMMUNICATING MESSAGES OF VARYING PROTOCOLS OVER A SINGLE COMMUNICATIONS NETWORK

(75) Inventor: Gisli Hjalmtysson, Gillette, NJ (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 09/195,265

(22) Filed: Nov. 18, 1998

Related U.S. Application Data

(60) Provisional application No. 60/084,471, filed on May 5, 1998.

(51) Int. Cl.[7] .................................................. G06F 15/16
(52) U.S. Cl. ..................... 709/200; 709/206; 379/88.26; 379/88.27; 379/70
(58) Field of Search ..................... 709/200, 206; 379/88.26, 88.27, 70–72, 75, 77, 74, 88.12, 88.17, 88.18, 88.25, 212, 216, 211

(56) References Cited

U.S. PATENT DOCUMENTS

| | | | | |
|---|---|---|---|---|
| 5,799,307 | * | 8/1998 | Buitron | 707/100 |
| 6,151,386 | * | 11/2000 | Argade | 379/88.26 |

\* cited by examiner

*Primary Examiner*—Ario Etienne
(74) *Attorney, Agent, or Firm*—Rohini K. Garg

(57) ABSTRACT

A method and system enhance communication capabilities between a message sender and a message recipient. The message sender generates a message notification that identifies to the recipient a recording/playback technique associated with message content. The recipient uses the information in the notification to load the playback technique. The information in the notification can be the code for the playback process or an indirect reference to the code, i.e., identification of the place from which the code can be retrieved.

43 Claims, 3 Drawing Sheets

METHOD AND APPARATUS FOR COMMUNICATING MESSAGES OF VARYING PROTOCOLS OVER A SINGLE COMMUNICATIONS NETWORK

CROSS-REFERENCE TO RELATED APPLICATIONS

This application claims benefit of U.S. provisional application no. 60/084,471, filed May 5,1998.

BACKGROUND OF THE INVENTION

The present invention is directed to a method and system for providing the communication of messages of various protocols over a communications network. More particularly, the present invention provides a method and a system by which a message coding/decoding technique can be defined arbitrarily by, for example, one of two communicating parties and the other party can receive the message by using a retrieved copy of the coding/decoding technique.

Messaging has become increasingly important for individuals and for business entities. In much the same way that traditional communication services have been carried on separate infrastructures, messaging capabilities are being offered on different service platforms using different interfaces depending on the message media. As an example, voice messaging is offered by many telecommunication companies. Voice messaging is often provided using a network resident answering machine that can be remotely operated using a telephone. At the same time that voice messaging has continued to be heavily used, there has been growing interest in electronic mail (e-mail) services by which electronic messages can be transmitted between parties using a data network such as the Internet. Customers would be better served if these various communication services which have been provided on separate infrastructures could somehow be integrated upon the same infrastructure. Specifically, it would be beneficial if integration of user access to e-mail and voice mail could be achieved by unifying messages with respect to all known media and also by infringing service specific message coding and decoding.

Another shortcoming extant in present messaging architectures is that a messaging technique to be employed between two parties is limited by the player/receiver capabilities of the respective end terminals. Thus, a given receiver can only receive content of known media and format. Before viewing or playing published content, a receiver must know the media of the content and the format of the content and must provision its own end device, (for example, a work station), with an appropriate program that is capable of playing the content. The receiver also must perform a mapping to enable a content browser to execute this program on seeing the identified content type. Thus, a receiver is limited in its ability to play a message content and cannot receive a message of unknown type. This limitation means that the sender and the receiver must negotiate or coordinate to assure that a transmitted message can be accurately received by the intended recipient. Furthermore, this problem is more acute where the transmitter desires to use some new message type, whereby the receiver must be provided with a player that is adapted to deal with this new message type.

SUMMARY OF THE INVENTION

The present invention provides a method and system for enhancing message communication between parties. In accordance with the present invention, a message may be generated using any intended recording technique, including a new recording technique previously unknown to any recipients. A message notification signal is then sent from the sender to an intended recipient in a format familiar to the recipient. The message notification includes sufficient information to enable the recipient to receive messages recorded by the first recording technique even if the intended recipient does not already have a player adapted to play messages recorded in accordance with the first recording technique.

In one embodiment of the present invention, the message notification includes software code for the playback technique. Furthermore, the message content can be included either with the code for the playback technique or in a subsequent transmission directed to message content.

In an alternative embodiment, the message notification includes an indirect reference to the player code. The indirect reference could be a pointer to where code for the playback technique can be found or, for example, a universal resource locator (URL). The recipient can then use the indirect reference to retrieve the playback technique (and possibly the recording technique) to facilitate the comprehension of the message generated in accordance with the first recording technique. Using an indirect reference can be beneficial in that it avoids the need for sending code for a playback technique with every message and simply provides the intended recipient with a reference to, for example, a server or other central location at which one or more such playback techniques could be stored and accessed when necessary. In yet another alternative embodiment, the message may be associated with multiple playback routines and code for these multiple routines could be included in the message notification or indirectly referred to by that notification.

In yet another alternative, the message content itself is not included in the transmission from the message originator to the message recipient. Instead, the transmission to the recipient could include an indirect reference to the location of the message content. Again, such an indirect reference could constitute a pointer or a URL. This would allow the called party to retrieve the message as desired and would reduce the bandwidth requirements for the communication that occurs explicitly between the first party and the second party. This also allows the message recipient to receive large amounts of data, virtually infinite content, and this could be extended to include content related to a live broadcast.

In another embodiment of the present invention, a server can act as a message repository, storing messages generated in accordance with multiple recording techniques. The message could then be transferred to the intended recipient using a decoder or player that converts the received message to a format that will be understandable by the intended recipient.

DETAILED DESCRIPTION

In accordance with the present invention, a message sender can generate a message in accordance with any recording technique (that is, any previously known or new recording technique) and provide that message to a recipient whereby the recipient, without having prior knowledge of the recording technique, will be able to play back the message. In particular, in accordance with one aspect of the present invention, the message sender generates a message attribute or notice about the message to be sent. That message attribute includes a playback mechanism to be utilized to play the recorded message. Subsequently, or as part of the same transmission, the message sender provides the recorded message to the recipient. Thus, the message sender does not have to worry about whether or not the recipient has the capability of playing back a message. The message sender avoids the issue altogether by simply automatically providing the playback mechanism to the recipient. In addition, the sender could transmit multiple playback techniques, thereby allowing the receiver the flexibility to activate or use a playback technique more consonant with its execution environment.

In a modification to the present invention, the message sender provides an indirect reference to the playback technique—that is, some indicator of where the recipient can obtain a copy of the playback technique(s). The message attribute would then include this indirect reference rather than an explicit presentation of the playback technique or code. The indirect reference could constitute a pointer to an address which the recipient can use to retrieve the playback technique(s). As another example, the indirect reference could be a universal resource locator (URL) such as those utilized to retrieve a document or page of information on the worldwide web. The indirect reference can enable the receiver to automatically retrieve the playback mechanism or to retrieve that mechanism under the direction of the user of the receiver. Similarly, the message sender could either send the entire contents of the message to the recipient or could simply send an indirect reference regarding the message content whereby the recipient could then use the indirect reference to retrieve the actual content itself. Once the playback mechanism and the content have been received, the recipient is able to play back the message generated by the sender.

Figure 1:
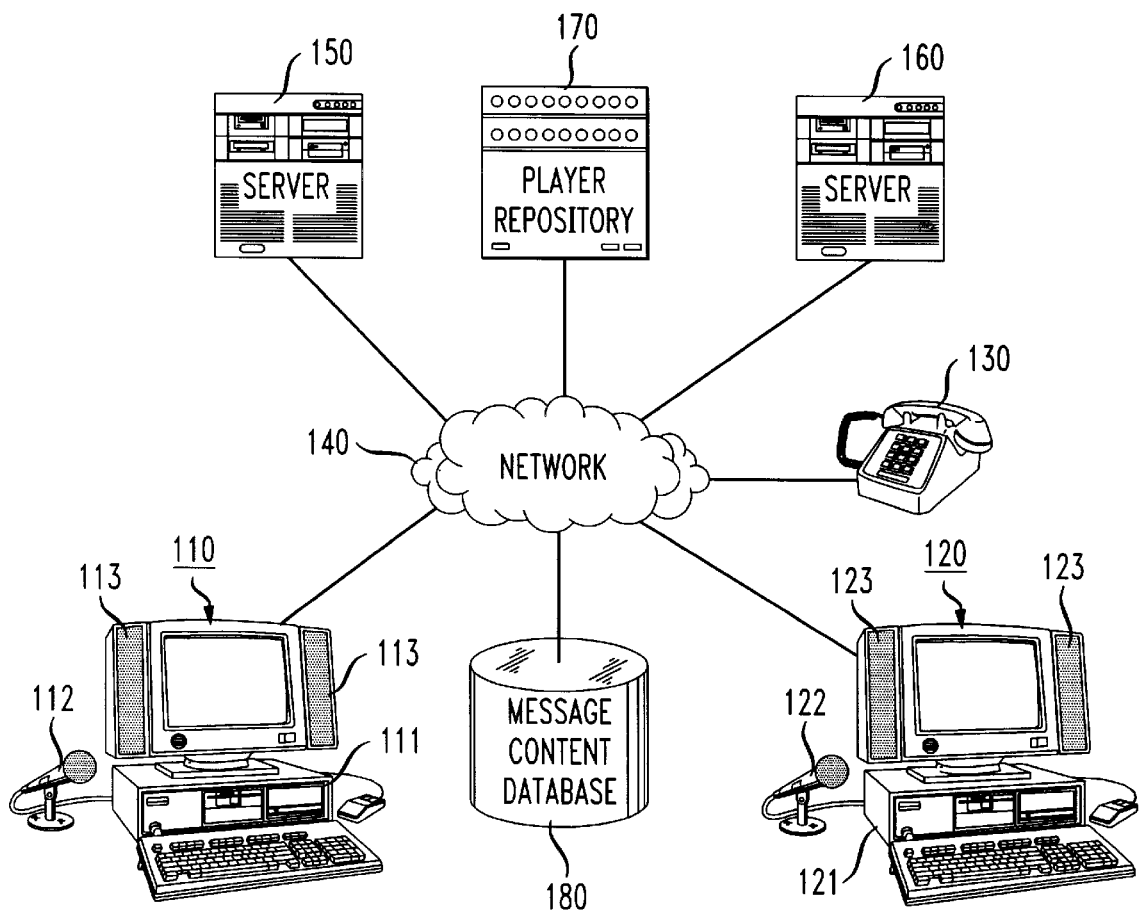
FIG. 1 provides a block diagram representation of a system in which an embodiment of the present invention can be implemented.

FIG. 1 provides a block diagram illustration of a system in which the present invention may be employed. A user at terminal equipment 110 can communicate with a user at terminal equipment 120 or telephone 130. Communications can occur over a network 140. Terminal equipment 110 could include a computer such as 111, which can be a device such as a personal computer, and possibly audio-related devices such as microphone 112 and speakers 113 for permitting audio communication at the location of terminal equipment 110. Similar equipment 121, 122 and 123 can be provided at terminal equipment 120. Telephone 130 can have a land line connection into the network. Alternatively, telephone 130 could be a wireless phone which would be coupled to a wireless network and then coupled into the communication network 140. Servers 150 and 160 are coupled to the network and will provide servicing options for the communication participants as will be described below. Additionally, the system may include a database for storing message content, 180, and a repository for playback mechanisms, 170.

Figure 2:
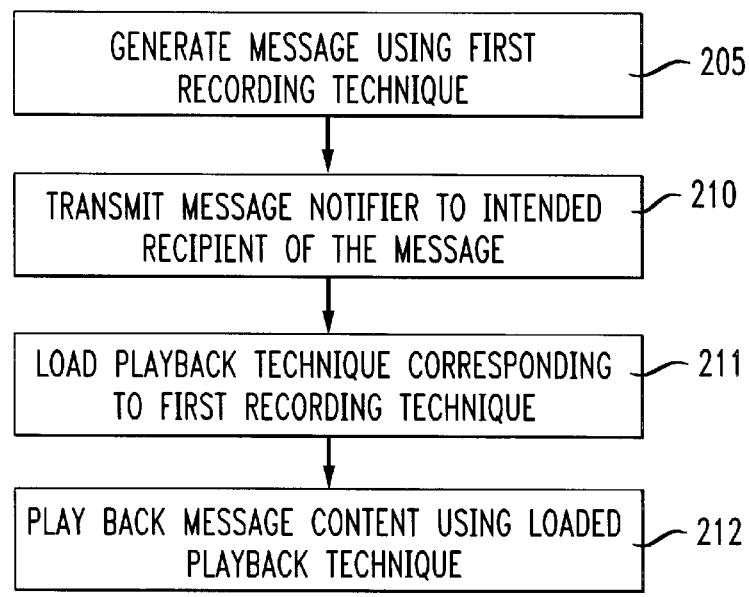
FIG. 2 provides a flow diagram describing a method in accordance with the first embodiment of the present invention.

FIG. 2 provides a flow diagram of a general process flow in accordance with implementing the present invention in a system such as that shown in FIG. 1. After describing that process flow, more specific examples of communications among the terminal equipment 110, 120 and 130 will be described.

In a method in accordance with an embodiment of the present invention, a message sender first generates a message using a first recording technique either selected by the sender or defined by the terminal equipment which the sender is using, step 205. The sender transmits a message attribute or notifier to the intended recipient of the message, step 210.

Figure 3:
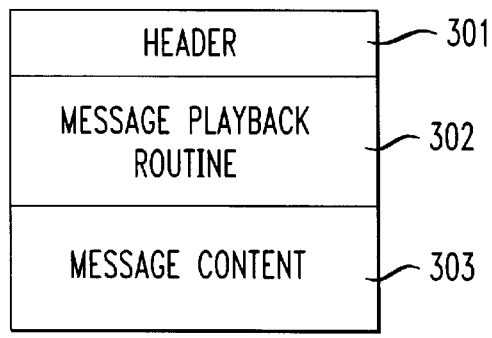
FIGS. 3 and 4 provide alternative embodiments of message structures which can be used with embodiments of the present invention.
Figure 4:
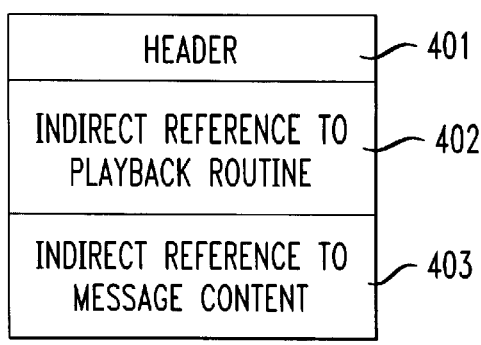

FIGS. 3 and 4 provide examples of structures which might be utilized as message attributes. The message attribute could include a header (301 or 401) and then could include the message playback routine (302) (402) and the message content (303) or an indirect reference to the playback routine and an indirect reference to the message content (403). Naturally, some combination of the actual playback routine or message content and indirect reference to either the routine or the content could be provided as well.

Once the message attribute is received by the recipient, the recipient can load the playback technique corresponding to the first recording technique, step 211. For example, if the message attribute were to correspond to the structure shown in FIG. 3, the received message playback routine would simply be loaded by the playback equipment. If, however, a structure similar to that in FIG. 4 was utilized, then the receiving terminal would use the indirect reference to retrieve a playback routine associated with the indirect reference and would then load the playback technique. The playback mechanism could be retrieved from a player repository such as that shown as element 170 in FIG. 1. Once the playback technique has been loaded, the receiver equipment can then play back the message content using the loaded playback technique, step 212. Again, if the message content has been transmitted to the recipient by the sender as in FIG. 3, step 212 simply amounts to a playing of the already received message content. If, on the other hand, the recipient has only received an indirect reference to the message content, the recipient can then go and retrieve the message content from the appointed location, such as from message content database 180 for example, and then play it back upon receipt of the content.

In accordance with the embodiment of the present invention thus described, the sender need not be concerned that the receiver has the playback mechanism corresponding to the recording technique selected at the sender. This avoids the provisioning problem which might otherwise arise in the prior art and also allows for a faster implementation and deployment of new recording/playback techniques.

It should be noted that this invention is also useful for permitting parties using differing recording and/or decoding technologies so long as the message notifications can be readily exchanged and understood.

A couple of brief examples will now be set forth to further clarify the operation of the present invention.

In connection with a first example, it will be presumed that the terminal equipment 110 corresponds to a message sender and the terminal equipment 120 corresponds to a message recipient. The terminal equipment 110 can initiate a message transmission by first generating message content and then recording it in accordance with a selected recording technique. The message sender then generates a message notifier or attribute and transmits that information to the terminal equipment 120 via the network 140. In a first example, it is presumed that the message attribute is structured in a manner similar to that shown in FIG. 3. In that circumstance, the message recipient 120 loads the transmitted playback technique into the terminal equipment and then plays back the received message content that was included in the message notifier. In the instance where the message sender uses a message notifier structure more like that illustrated in FIG. 4, it is possible that the server 150 or repository 170 may store a plurality of playback techniques and the message content database 180 may store a plurality of message contents. Then, when the message notifier, which includes indirect references to the message playback technique and the message content, is received at the terminal equipment 120, that equipment can use those references to retrieve the playback technique from server 150 or repository 170 or the identified message content from server 150 or from some other database such as message database 180 or from the sender itself. As a result of this arrangement, the terminal equipment can communicate messages back and forth between them without having to negotiate any protocols. Instead, either party can designate the appropriate messaging technique and either give the other the playback technique or point out where the playback technique can be retrieved. In fact, it is possible that in communicating messages between, for instance, terminal equipment 110 and 120, each terminal equipment might utilize a different recording technique for its message content or the message recording technique for each party might change over time. Taking the instance where each party uses different message recording techniques, then each party can identify to the other the specific recording technique utilizes. It can also provide either a playback technique corresponding to the recording technique or an indirect reference to such a playback technique. This latter information will enable the other party to receive a message that is recorded in a manner different than that party records its own messages. Naturally, it is possible that the message recipient will rely on the server to play back the message rather than to transfer the playback mechanism. In this circumstance, the server might have to retrieve the playback mechanism from elsewhere.

In another embodiment of the present invention, the message sender and recipient are permitted to operate with completely different recording/playback techniques. For example, in FIG. 1 a party at telephone 130 may desire to have access to e-mail messages and a party at 110 may be interested in providing an e-mail message to the party at 130. The party at 130 using simply their telephone cannot receive an e-mail message. However, in accordance with the present invention, the message sender at 110 could send an e-mail message to server 160. A notification message could be sent to telephone 130 using the messaging techniques appropriate for sending a telephone call to the party at telephone 130. This notification could be generated by server 160 and it could be generated under the direction of the message sender. At that time, the user could be informed that an e-mail message awaits delivery. This information could be provided by any voice prompting system which is already known to those of skill in the art. In fact, a series of prompts providing the user at telephone 130 with audio information and requesting either audio inputs or touch tone inputs could be provided. Once the intended recipient at telephone 130 is advised of the existence of the message at server 160, the intended recipient can select the playback mechanism for providing the message content to the intended recipient. Thus, the server 160 can be advised that the intended recipient has a playback mechanism which can only provide a telephone-type presentation of the information to the end user. The server can then select among a number of different available playback mechanisms which essentially translate the message from the first encoded form into a form that can be comprehended utilizing the terminal equipment or telephone 130. In that circumstance, the server could act much like the message recipients described above with respect to the particular examples that refer to terminals 110 and 120. In particular, the server could receive a message notifier that includes the playback technique and the message content or alternatively the server could receive a notification as to the location of the playback technique and/or the message content. The server could then retrieve the message and play it in accordance with the method or technique by which it was recorded and then provide whatever translation is necessary to enable an end user at terminal 130 to receive the message content. The latter arrangement provides a virtual point of service. Alternative configurations interfacing different messaging techniques beyond the e-mail/voice representations described above could be provided.

Figure 5:
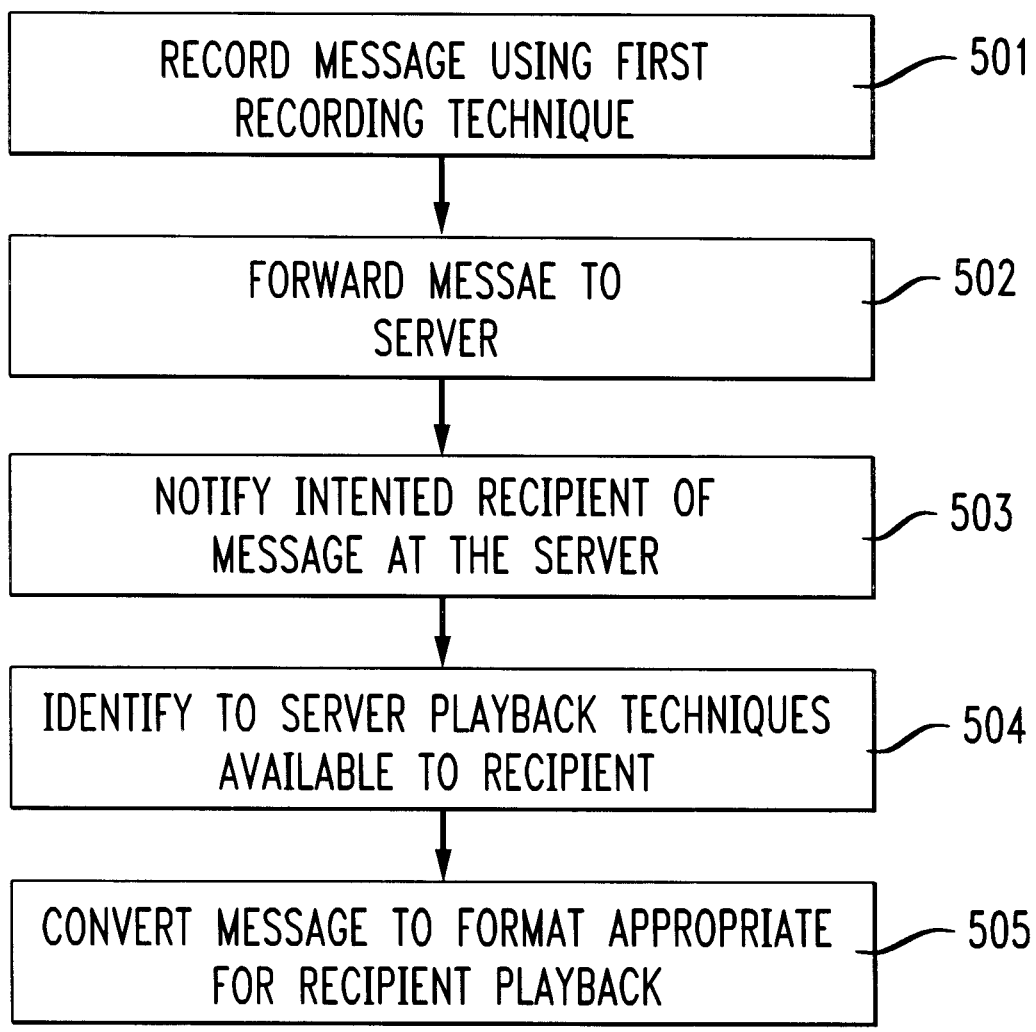
FIG. 5 provides a flow diagram describing another embodiment of the present invention.

FIG. 5 shows a flow diagram to implement this embodiment. A first party records a message using a first recording technique (step 501) and forwards the message to a server (step 502). The intended recipient is notified about the existence of the pending message (step 503). The recipient can then advise the server about the play back techniques available to the recipient (step 504). The server can then convert the message to a format for the recipient's play back technique (step 505).

The present invention thus allows one or more parties to communicate without advance knowledge or provisioning of the techniques used for generating messages. The technique supports arbitrary types of messaging, that is, recording or coding techniques, including new ones, and permits even non-subscribers to be recipients of messages. What this also allows is the easy introduction of new messaging techniques by assuring that updates across the network need not be provided. The upgrades can be retrieved as needed. Also, the network configuration itself, including its signaling, need not be changed to present new messaging techniques. Furthermore, by sending indirect references rather than the complete playback technique or the complete message content, the intended recipient can download only what is needed when desired. For example, if an intended recipient has already had communications with either the same message sender or another message sender employing this particular messaging technique, it is possible that the recipient has cached the playback technique. Under those circumstances, the recipient need not retrieve or receive an entire copy of the playback technique. Thus, if only an indirect reference is provided to the playback technique, the transmission of unnecessary information—here the previously cached playback technique—is avoided.

The above-described active messages (that is, messages which either include or refer to techniques for playback so that the messages not only contain message content but also some information enabling the recipient to play back the message), overcome the shortcomings of the known messaging schemes which require either negotiation or wide dissemination of new messaging techniques before any one message sender can make use of those techniques.

What is claimed is:

1. A method for communicating a message from a first entity to a second entity, the method comprising the steps of:

generating a message using a recording technique selected by the first entity;

associating a message attribute with the generated message, said message attribute including an identification of a message playback technique relating to said recording technique selected by the first entity; and transmitting the generated message and associated message attribute to the second entity.

2. The method of claim 1 wherein said identification includes an indirect reference to code for playing back the message content.

3. The method of claim 2 wherein said indirect reference includes a pointer to the code for playing back the message content.

4. The method of claim 2 wherein said indirect reference refers to code for a plurality of playback techniques selectable by a recipient of the message.

5. The method of claim 2 wherein said indirect reference includes a URL.

6. The method of claim 5 wherein code for a plurality of playback techniques, selectable by a recipient of the message, is associated with the URL.

7. The method of claim 1 wherein said identification includes code for playing back the message content.

8. The method of claim 7 wherein said code for playing back the message content includes code for a plurality of playback techniques.

9. The method of claim 8 wherein at least one of the plurality of playback techniques is applicable to a receiver's playback environment.

10. A method for communicating a message from a first entity to a second entity comprising the steps of:
   receiving from the first entity, a message package that includes message content and a message attribute;
   transmitting from the second entity, a request to retrieve a playback mechanism related to said message attribute transmitted to said second entity;
   retrieving said requested playback mechanism; and
   forwarding said retrieved playback mechanism to the second entity.

11. The method of claim 10 wherein said message attribute includes an identification of a playback technique associated with the message content.

12. The method of claim 10 wherein said message attribute includes an indirect reference to code for playing back the message content in accordance with said playback technique.

13. The method of claim 12 wherein said indirect reference includes a pointer to the code.

14. The method of claim 12 wherein said indirect reference refers to code for a plurality of playback techniques selectable by a recipient of the message.

15. The method of claim 12 wherein said indirect reference includes a URL.

16. The method of claim 15 wherein code for a plurality of playback techniques, selectable by a recipient of the message, is associated with the URL.

17. The method of claim 11 wherein said identification includes code for playing back the message content.

18. The method of claim 17 wherein said code for playing back the message includes code for a plurality of playback techniques.

19. The method of claim 18 wherein at least one of the plurality of playback techniques is applicable to a receiver's playback environment.

20. The method of claim 10 wherein said playback mechanism generates an audio presentation of the message content.

21. The method of claim 10 wherein said playback mechanism generates a video display presentation of the message content.

22. A method for communicating a message in a first medium from a first entity to a second entity with presentation in a second medium, the method comprising the steps of:
   generating a message package including a message content and a message attribute associated with said message content, said message attribute identifying a recording technique associated with the first medium;
   transmitting said message package to the second entity; and
   retrieving, based on the message attribute, a playback technique associated with said identified recording technique and said second medium for playing back the message content.

23. The method of claim 22 wherein said message attribute indicates that the message content was generated by audio recording.

24. The method of claim 22 wherein said playback technique generates an audio presentation of the message content.

25. The method of claim 22 wherein said playback technique generates a video display presentation of the message content.

26. The method of claim 23 wherein said playback technique generates a video display presentation of the message content.

27. A method for communicating a plurality of messages from a first entity to a second entity, the method comprising the steps of:
   generating, for each of the plurality of messages, a message package including a message content portion and a message attribute portion;
   transmitting said messages packets to the second entity;
   retrieving, in response to an attribute portion of one of said message packets a playback mechanism for presenting the message content of said one of said message packets; and
   caching said retrieved playback mechanism.

28. The method of claim 27 comprising the further step of retrieving the cached playback mechanism upon receipt of a second message packet having a message attribute corresponding to the message attribute of said first one of said messages.

29. The method of claim 27 wherein said step of retrieving comprises the substeps of,
   identifying a playback environment at the second entity, and
   selecting a playback mechanism based on the identified playback environment and the message attribute portion.

30. The method of claim 29 wherein said message attribute portion includes an indirect reference to code for playing back the message content.

31. The method of claim 30 wherein said indirect reference includes a pointer to the code for playing back the message content.

32. The method of claim 30 wherein said indirect reference refers to code for a plurality of playback techniques selectable by a recipient of the message.

33. The method of claim 30 wherein said indirect reference includes a URL.

34. The method of claim 33 wherein code for a plurality of playback techniques, selectable by a recipient of the message, is associated with the URL.

35. A method for communicating a message from a first entity to a second entity, the method comprising the steps of:
   generating a message using a recording technique selected by the first entity;
   associating a message attribute with the generated message, said message attribute including an identification of a message playback technique relating to said recording technique selected by the first entity; and transmitting to a second entity an indirect reference to the generated message and the message attribute associated with said generated message.

36. The method of claim 35 wherein said identification includes an indirect reference to code for playing back the message content.

37. The method of claim 36 wherein said indirect reference includes a pointer to the code for playing back the message content.

38. The method of claim 36 wherein said indirect reference refers to code for a plurality of playback techniques selectable by a recipient of the message.

39. The method of claim 36 wherein said indirect reference includes a URL.

40. The method of claim 39 wherein code for a plurality of playback techniques, selectable by a recipient of the message, is associated with the URL.

41. The method of claim 35 wherein said identification includes code for playing back the message content.

42. The method of claim 41 wherein said code for playing back the message content includes code for a plurality of playback techniques.

43. The method of claim 42 wherein at least one of the plurality of playback techniques is applicable to a receiver's playback environment.

* * * * *